July 4, 1967  W. C. LAMAR  3,329,529
COMBINED OVEN AND DISHWASHER
Filed May 10, 1963  2 Sheets-Sheet 1
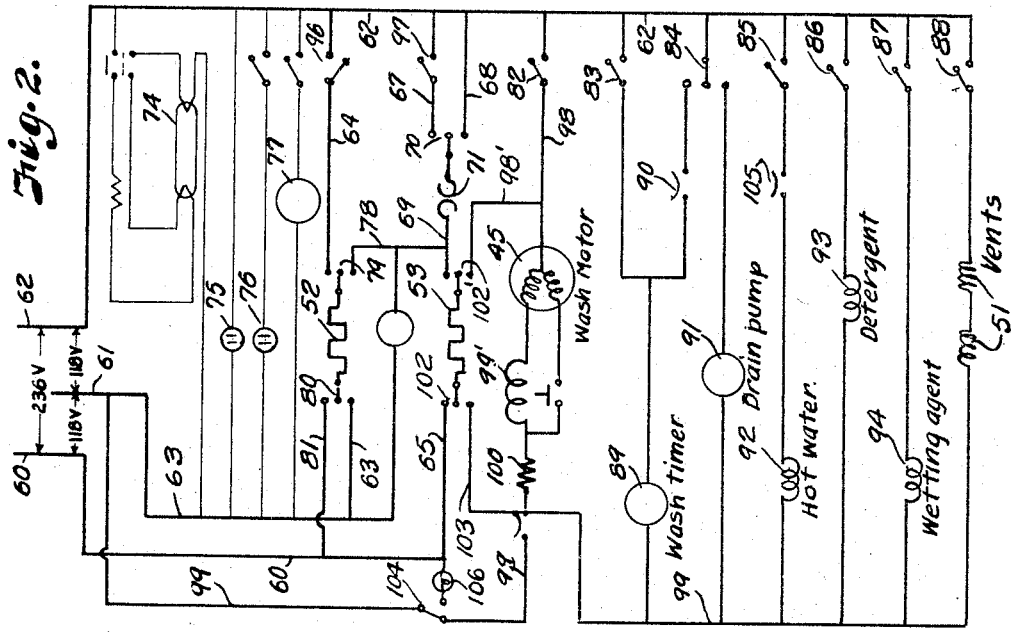
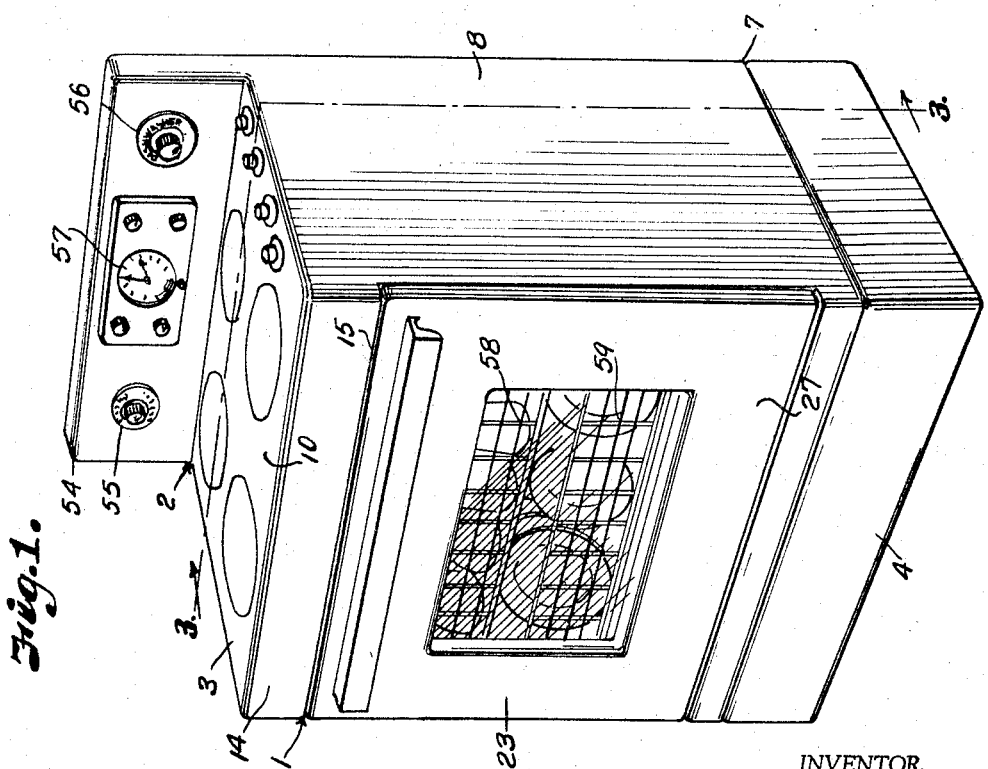
INVENTOR.
William C. Lamar
BY
Paul E Mullendore
ATTORNEY

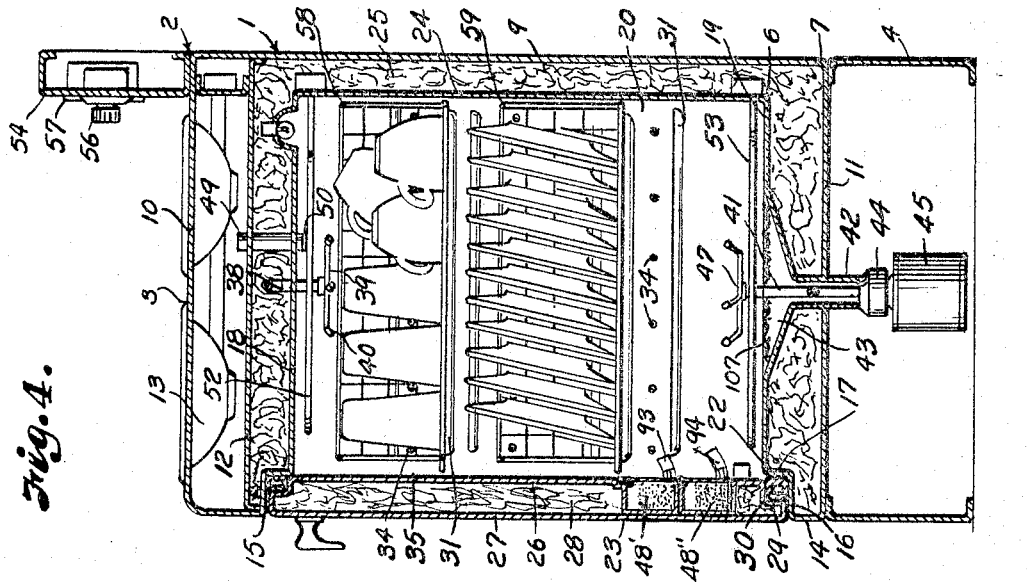
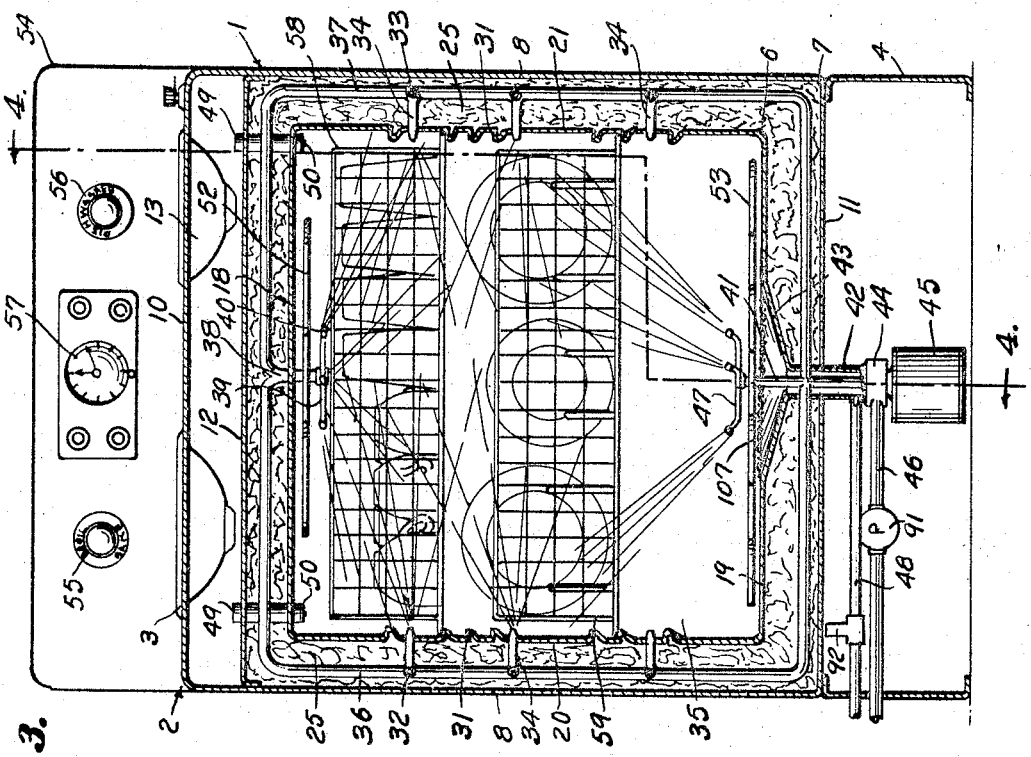

United States Patent Office 3,329,529
Patented July 4, 1967

3,329,529
COMBINED OVEN AND DISHWASHER
William C. Lamar, 5941 Holmes St.,
Kansas City, Mo. 64110
Filed May 10, 1963, Ser. No. 279,557
13 Claims. (Cl. 134—22)

This invention relates to baking and broiling ovens such as form a part of kitchen ranges or in wall units, and has for its principal object to provide an oven of this character which may also be used as a dishwasher.

In carrying out the invention, I find that an oven and dishwasher are seldom used at the same time, therefore, the oven chamber may be equipped with dishwashing apparatus that does not interfere with the baking facilities, and in, fact, the heating elements of the oven serve as the heating elements of the dishwasher, and the electric circuits of the dishwashing apparatus may be readily connected into the oven circuits. Also, the shelf guides of the oven serve to support the baskets in which the dishes are placed for washing.

Another advantage is that the usual oven stains and greases are not a problem, since the oven is cleaned with hot water and steam each time it is used as a dishwasher.

Other objects of the invention are to reduce the cost of a combined unit; to provide the oven vents with automatic valves that close when starting the dishwashing cycle and which open to vent the oven when the dishwashing cycle is completed; and to provide a combined unit which conserves space in the modern kitchen or which is especially desirable in house trailers.

In accomplishing these and other objects of the invention, I have provided improved structure, the preferred form of which is illustrated in the accompanying drawings, wherein:

FIG. 1 is a perspective view of a combined dishwasher and oven embodying the features of the present invention with a kitchen range.

FIG. 2 is a wiring diagram of the electric circuits employed in the combination unit.

FIG. 3 is a vertical section through the range on the line 3—3 of FIG. 1.

FIG. 4 is a transverse section through the range taken at right angles to the section of FIG. 3, on the line 4—4 of FIG. 3.

FIG. 5 is a detailed section through one of the oven vents, and particularly illustrating the automatic valve for closing the vent when the oven is used as a dishwasher.

Referring more in detail to the drawings:

In the form of the invention to be illustrated and described, the combination oven and dishwasher 1 is incorporated into the construction of a conventional range 2, however, it is to be understood that the unit 1 may comprise an in-the-wall construction which differs only by omitting the cooking top 3 of the range.

The range 2 includes a base 4 for accommodating various piping and mechanisms of the dishwashing apparatus later to be described. Carried on the base 4 is an insulated housing comprising inner and outer casings 6 and 7. The outer casing 7 has side sheets 8, a back sheet 9, a top sheet 10, and a bottom sheet 11. In the illustrated instance, the top sheet 10 constitutes the cooking top 3 of the range, and a sheet 12 is interposed below the top sheet 10 to form a burner compartment 13 therebetween.

The front of the outer casing is closed by a front sheet 14 having a rectangular door opening 15 therein. Extending inwardly of the door opening are flanges 16 that join with the front sheet 17 of the inner casing 6. Offset with the inwardly extending flanges 16 that surround the door opening 15 are top, bottom and side sheets 18, 19, 20 and 21 of the inner casing 6. The offset provides a shoulder 22 extending all the way around the door opening 15, to provide a stop against which a door 23 closes. A back 24 of the inner casing 6 is spaced from the rear sheet 9 of the outer casing. The sheets composing the inner and outer casings are all connected together at their meeting edges to provide leaktight joints. The corresponding sheets of the inner and outer casings are thus spaced apart to accommodate insulation 25 which completely surrounds the inner casing. The door 23 also has inner and outer sheets 26 and 27 to accommodate space for insulation 28. The inner marginal edges of the inner sheet of the door are shaped to provide marginal shoulders 29 facing the shoulder 22 to contain a fluid-tight gasket 30. The gasket 30 may be fastened to either the shoulder on the door or the shoulder on the inner casing in order to retain it in place. The door is hinged in the usual manner of an oven door, preferably at the bottom thereof so that it swings downwardly.

The inner side sheets 20 and 21 of the inner casing are formed to provide a vertical series of horizontally extending rack-supporting ledges 31, as in the usual oven construction.

In carrying out the present invention, the insulated spaces in the respective side walls also contain horizontal manifolds 32–33 provided with jet nozzles 34 discharging into the oven chamber 35. The manifolds are connected by vertical pipes 36 and 37 located within the insulation spaces. The upper ends of the pipes 36 and 37 have inwardly extending terminals to connect in the center of the oven with a depending pipe 38 that projects through the top sheet 18 of the inner casing and carries a revolving spray head 39, which is preferably actuated responsive to discharge of fluid through jet nozzles 40.

The ends of the lower pipes 36 and 37 have inwardly extending lateral terminals that connect with a vertical pipe 41 that extends longitudinally within a drain pipe 42. The drain pipe 42 connects with a sump 43 formed in the bottom sheet 19 of the inner casing of the oven and connects at its lower end with a waste pipe 46 that is adapted to be connected with a sewer (not shown). The connection is made through a pump 44 having a discharge connected with the pipe 41. The inlet of the pump 44 is connected with the drain pipe 42 to draw wash liquid therefrom and force it under high pressure through the spray jets. The pump 44 is operated by a motor 45.

The upper end of the pipe 41 projects into the oven chamber and carries a spray head 47 similar to the spray head 39. Hot water under pressure is supplied to the drain pipe through a lateral connecting duct 48.

The oven chamber 35 is vented through ducts 49 that extend from within the oven chamber upwardly through the top sheets 12 and 18 of the outer and inner casings, as best shown in FIGS. 3 and 4. In order that the ducts may be closed when the oven chamber is used as a dishwasher, the ducts are provided with valves 50 which are automatically actuated by solenoids 51 (see FIG. 5). Positioned within the top and bottom of the oven chamber are electrical heating elements 52 and 53 in accordance with the usual oven construction.

Carried by the outer casing is a panel 54 mounting switches 55 and 56 for controlling, respectively, the oven heating element circuits and circuits for the dishwashing apparatus. The panel may also carry a timing clock and associated switches, as indicated at 57, in the manner of a conventional range.

Suitable baskets 58 and 59 are provided to hold and support dishes to be washed within the oven chamber, as later to be described.

Compartments 48′ and 48″ are provided in the door 23 to contain supplies of detergent and a wetting agent to be used in the wash and rinsing of the dishes.

Electric current is supplied to the heating elements 52 and 53 through a three-wire circuit comprising conductors 60, 61 and 62 (see FIG. 2). The upper heating element 52 is connected across the conductors 61 and 62 by branch conductors 63 and 64. The lower heating element 53 is connected in circuit across the conductors 60 and 62 by branch conductors 65 on one side and branch conductors 67, 68 on the other side that are selectively connected with a conductor 69 by a switch 70, an oven thermostat 71 being inserted in the conductor 69.

The range may be provided with a fluorescent lamp 74, a plug-in electric outlet 75, a timed plug 76, and a timing motor 77, all connected in parallel between the conductors 61 and 62, the timing motor being operated by the clock 57 to open the circuits after elapse of a period of time.

In order that the upper heating element 52 may be used to supplement the heat furnished by the lower element 53, the conductor 69 is connected by a conductor 78 with a switch 79 that disconnects the heating element 52 from the conductor 64 and connects it to the conductor 78. The opposite side of the heating element 52 has a switch 80 that disconnects the heating element from the conductor 63 and connects it with a conductor 81 leading to the conductor 60. The heating element circuits have switches 96 and 97 operated by the dial 55. All of the above described circuits are conventional to any modern range, and by themselves are no part of the present invention.

The dishwasher is automatically and electrically controlled by the dial switch 56 that incorporates an automatic timer which includes switches 82, 83, 84, 85, 86, 87 and 88 to close circuits to the motor 45, a wash timer 89, a washing fluid thermoswitch 90, a pump drain motor 91, a fill solenoid 92, a solenoid 93 to open a door of the detergent compartment 48', a solenoid 94 to open a door of the wetting agent compartment 48", and solenoids 51 that operate the vent valves 50. The motor 45 is connected to the conductor 62 by a conductor 98 in which the switch 82 is connected and with a switch 102' at the end of the heating element 53 by a conductor 98'. The other side of the motor 45 is connected with the conductor 61 by a conductor 99 in which is connected a relay switch 99' and a motor overload switch 100.

Connected to the opposite end of the lower heating element 53 is a switch 102 that disconnects the conductor 65 and connects with the conductor 99 through a conductor 103. The conductor 99 has a safety switch 104 operated by the oven door 23.

Connected in circuit with the solenoid valve 92 of the hot water supply pipe 48 is a switch 105 operated by the water pressure.

*Baking or broiling*

When the oven is to be used for baking or broiling, the dial of the switch 55 is set to either broil or bake, as desired. If baking is contemplated, the oven timer switch 97 may be set to open the circuit to the heating elements 53 and/or 52 at the end of the baking period, depending upon the oven temperature required. During the baking period the oven thermoswitch 71 operates to maintain the desired oven temperature. Also, during baking the oven vents 49 are open to provide circulation that is required to maintain a substantially constant uniform temperature in all parts of the oven.

*Dish washing*

When the oven chamber 35 is to be used for washing dishes, the oven shelves (not shown) are removed by sliding them off the guides 31 and out the opened door 23 to clear the way for the baskets 58 and 59. The dirty dishes are racked in the baskets, and the baskets with the dishes therein are slid into the oven chamber for support by the guides 31. When the door 23 is open, the switch 104 is also open and in contact with the circuit having the oven light 106 to light the oven. A quantity of detergent and a wetting agent are placed, respectively, in the compartments 48' and 48". The door 23 is now closed to make sealing contact of the gasket 30 to prevent leakage of washing fluid around the door. The dial of the switch 56 is turned to dishwashing position, to bring the switches 82 to 88, inclusive, into operation in performing the various dishwashing operations.

The operations in the illustrated instance are, first, flushing of the oven with water, followed by wash, drain, rinse, drain, wash, drain, rinse, drain, rinse, drain and dry periods, all started in proper sequence by the order of closing the switches 82 to 88, inclusive.

The first switches to close are the switch 83 in the wash timer circuit to energize the wash timer 89, the switch 85 controlling the hot water admission circuit to energize the fill solenoid valve 82, the switch 82 that controls the wash motor 45 for operating the pump 44, the switches 102 and 102' that brings the lower heating element 53 from the high voltage circuit into the low voltage circuit, and the switch 88 that establishes the circuit which closes the oven vents 49.

At the end of the flushing operation, the switch 85 opens to shut off the admission of hot water, and the switch 84 closes to energize the motor of the drain pump 91, to remove the flushing liquid.

The first wash is now started upon reclosing of the switch 85 for admitting a quantity of hot water and opening the switch 84 in the drain pump circuit. After the water is admitted, the switch 84 closes. The hot water in the sump 43 and the lower portion of the oven compartment is drawn in by the pump 44 and discharged under high pressure through the spray heads 39 and 47 and through the side jets 34 onto the dishes. The water drains from the dishes back toward the sump 43, carrying the food particles therewith. A screen 107 placed over the sump excludes large food scraps that cannot be safely carried off through the drain 46. The smaller food particles pass the screen 107. The water falling from the dishes is reheated by direct contact with the heating element 53 to maintain the temperature of the water.

At the end of the first wash period, the switch 84 again closes, to start the drain pump 91 for carrying off the dirty water to the place of disposal.

The following rinse begins with opening the switch 84 and closing of the switch 85 for admitting a supply of rinse liquid that is circulated by the pump 44 to the various sprays discharging onto the dishes. At the end of the rinse period the switch 84 is closed to effect removal of the rinse liquid.

The next wash now begins with the switch 84 closing, and the switch 85 closing to admit the wash liquid. At this time the switch 86 momentarily closes to energize the solenoid 93 to discharge the detergent from the compartment 48', so that a detergent is mixed with the wash liquid.

The following drain, rinse and drain steps are carried out in accordance with the first drain and rinse steps, but no detergent is used. However, on the next rinse step the switch 87 is closed to effect discharge of the wetting agent from its compartment 48" to mix with the rinse water and prevent spotting of the glassware and removal of any film.

After rinsing with the wetting agent, the rinse fluid is discharged and the dishes are allowed to dry under influence of heat from the lower oven heating element for a time period, at the end of which the timer has opened all of the switches and stops, thereby completing the washing cycle.

The oven may now be used for baking after the baskets 58 and 59 have been removed and replaced by the baking shelves.

It is obvious that the washing, rinsing and drying of the dirty dishes in the oven chamber also results in simultaneously washing, rinsing and drying of the inner surfaces of the oven to remove any splatters and drippings that have resulted from a previous baking operation. Consequently, separate cleaning of the oven is not required, because the oven is cleaned with washing of the dishes therein.

From the foregoing it is obvious that the invention adapts a baking oven of a cooking appliance for dishwashing, so that limited kitchen space is conserved and permits the convenience of a dishwasher in kitchens, house trailers, boat galleys, and other places that are too small to accommodate separate units.

What I claim and desire to secure by Letters Patent is:
1. In a cooking appliance,
an oven chamber in which foods are cooked,
means connected with the oven chamber for supplying a washing solution, and
means in the oven chamber for circulating the washing solution into contact with interior surfaces of the oven chamber for cleaning said surfaces of grease splatters and drippings from the foods which have been cooked in the oven chamber.

2. In a cooking appliance,
an oven chamber having a sump in a bottom thereof for containing a washing solution,
a pump having an inlet in connection with the sump for drawing the washing solution from the sump and having an outlet,
spray means in the oven having connection with the pump outlet for discharging the washing solution forcibly into interior surfaces of the oven chamber under pressure for removing stains and greases collected thereon from foods cooked in the oven chamber, and
means connected with the sump for draining dirty washing solution from the sump.

3. In a cooking appliance as described in claim 2,
a heating element in said oven and in contact with the spray solution returning to said sump to heat the washing solution.

4. In a cooking appliance as described in claim 2.
means in the oven chamber for containing a detergent for mixture with the washing solution.

5. A combined oven and dishwasher including
an oven chamber,
an electrical heating element within the oven chamber for supplying heat for cooking purposes,
an electrical circuit connected with the heating element,
means for racking dishes in the oven chamber,
means associated with the oven chamber for washing and rinsing interior surfaces of the oven chamber of accumulations resulting from a previous use of the oven for cooking and simultaneously washing and rinsing the dishes in a series of cycles, and
control means in connection with the electrical circuit for controlling and timing said washing and rinsing cycles.

6. A combined oven and dishwasher including
an oven chamber,
a heating element in a lower portion of said oven chamber,
shelf guides at side walls of the oven chamber and located above the heating element,
baskets movable into the oven chamber on the shelf guides for racking dishes therein to be washed, rinsed and dried,
means for circulating washing and rinsing liquids over the dishes and into contact with interior surfaces of the oven chamber for removing accumulations resulting from previous use of the oven for cooking and into contact with the heating element to maintain temperature of the washing and rinsing liquids, and
means for draining the oven of said liquid to dry simultaneously the oven chamber and dishes therein by heat from said heating element.

7. A combined oven and dishwasher as described in claim 6, and including
means for controlling said circulating means in timed sequence with said draining means to first wash and then rinse with an intermediate and final operation of the draining means.

8. A combined oven and dishwasher including
an oven chamber,
a heating element in a lower portion of the said oven chamber,
shelf guides in the oven chamber above the heating element,
basket means for support on the shelf guides for racking dishes therein to be washed, rinsed and dried simultaneously with interior surfaces of the oven chamber,
means connected with a lower portion of the oven chamber for admitting washing and rinsing liquids into the oven chamber,
means for circulating the liquids over the dishes and into contact with interior surfaces of the oven chamber and into contact with the heating element to maintain temperature of the liquids,
means connected with the oven chamber for draining dirty wash liquid therefrom, and
means alternately controlling said liquid admitting means and said draining means to first wash and then rinse the dishes and the interior of the oven chamber.

9. A combination oven and dishwasher as described in claim 8, and including
means in the oven for containing a detergent,
means for releasing the detergent into the wash liquid during a washing period,
means in the oven for containing a wetting agent, and
means for discharging the wetting agent into the liquid during a rinsing period.

10. A combination oven and dishwasher including
an oven chamber,
heating means in the oven chamber for heating air therein for cooking foods,
vent means in an upper portion of the oven chamber to promote uniform heating,
means for racking dishes in the oven,
means for washing and rinsing the dishes including the interior surfaces of the the oven chamber,
control means for the washing and rinsing means, and
means cooperating with said control means for closing the oven vent means during washing and rinsing of the dishes and the interior surfaces of the oven chamber.

11. A combined oven and dishwasher including
an oven chamber,
a heating element in a lower portion of the said oven,
shelf guides at sides of the oven above the heating element
vents in the top of the oven chamber to vent said chamber during use of the oven for cooking,
baskets for support on the shelf guides for racking dishes therein to be washed, rinsed and dried simultaneously with washing and rinsing of interior surfaces of the oven chamber of accumulations which result with use of the oven for cooking,
means for admitting a washing and rinsing liquid into lower portion of the oven chamber,
means for circulating the liquid from the lower portion of the oven chamber over the dishes and into contact with the interior surfaces of the oven chamber and return to the lower portion of the oven chamber for contact with the heating element to maintain temperature of the liquid,
means in connection with the lower portion of the oven chamber for draining dirty wash liquid therefrom,
timing means controlling said liquid admitting and draining means, and
means actuated by the timing means for closing said vents during circulation of the liquid.

12. A domestic oven comprising a cabinet structure and a cooking cavity formed therein by an oven liner and a front-opening access door, insulating means surrounding the oven liner, heating means provided for the cavity, control means for obtaining the desired level of cooking temperatures, means for introducing cleaning fluid into the cavity, and fluid distributing means located within the cavity for collecting the fluid and circulating it throughout the cavity so as to remove any food soil and grease spatter lodged therein, draining means cooperating with the cavity for removing the soiled fluids therefrom, and means for converting the oven cavity to a dish washing compartment, said means including dish rack means supported within the oven liner so that during a washing operation food soil may be removed from both the oven walls as well as from dishes loaded into the oven cavity.

13. The method of cleaning from the interior surfaces of an oven liner defining an oven cavity food soils accumulated thereupon during the previous carrying out in said open cavity of normal food cooking operations in the normal food cooking temperature range extending from about 150° F. to about 550° F. said method comprising supplying cleaning fluids into said oven cavity, recirculating the fluids throughout the cavity at high velocity for a sufficient time to remove the food soil and grease spatter accumulated on the iner liner, removing the fluids from the cavity, supplying a rinsing agent into the cavity, and recirculating the rinsing agent to remove the cleaning fluids from the walls of the liner, and drawing off the rinsing agent from the oven cavity.

References Cited

UNITED STATES PATENTS

| | | | |
|---|---|---|---|
| 1,375,144 | 4/1921 | Frantz | 134—115 X |
| 1,893,797 | 1/1933 | Foster | 134—58 X |
| 2,222,960 | 11/1940 | Strachan | 134—115 X |
| 2,593,233 | 4/1952 | White | 312—236 X |
| 2,704,082 | 3/1955 | Jackson | 134—176 X |
| 2,722,225 | 11/1955 | Carson | 134—58 |
| 3,049,133 | 8/1962 | Jacobs | 134—57 |

CHARLES A. WILLMUTH, *Primary Examiner.*

R. L. BLEUTGE, *Assistant Examiner.*